United States Patent
Vora

(10) Patent No.: US 9,172,600 B1
(45) Date of Patent: Oct. 27, 2015

(54) EFFICIENT I/O ERROR ANALYSIS AND PROACTIVE I/O FAILOVER TO ALTERNATE PATHS FOR INFINIBAND CHANNEL

(71) Applicant: Symantec Corporation, Mountain View, CA (US)

(72) Inventor: Anurag Vora, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 117 days.

(21) Appl. No.: 14/145,883

(22) Filed: Dec. 31, 2013

(51) Int. Cl.
*H04L 12/24* (2006.01)

(52) U.S. Cl.
CPC .................................. *H04L 41/0668* (2013.01)

(58) Field of Classification Search
None
See application file for complete search history.

(56) References Cited

U.S. PATENT DOCUMENTS

| | | | |
|---|---|---|---|
| 7,711,978 B1 * | 5/2010 | Roy et al. ...................... | 714/5.11 |
| 8,041,987 B2 * | 10/2011 | Allen et al. ................... | 714/5.11 |
| 8,644,132 B2 * | 2/2014 | Chen et al. ..................... | 370/216 |
| 2002/0194294 A1 * | 12/2002 | Blumenau et al. ............. | 709/213 |
| 2003/0112746 A1 * | 6/2003 | Schaller et al. ................ | 370/216 |
| 2003/0145117 A1 * | 7/2003 | Bhat .............................. | 709/249 |
| 2003/0208631 A1 * | 11/2003 | Matters et al. ................ | 709/250 |
| 2005/0180432 A1 * | 8/2005 | Hirai .............................. | 370/397 |
| 2013/0051222 A1 * | 2/2013 | Gavrilov et al. .............. | 370/225 |

* cited by examiner

*Primary Examiner* — Brian Roberts
(74) *Attorney, Agent, or Firm* — Brill Law Office; Jeffrey Brill

(57) ABSTRACT

An InfiniBand managed storage environment is made up of processor nodes containing HCAs and managed storage devices containing TCAs and exposing a plurality of LUNs and volumes. For each InfiniBand channel between a specific HCA and a specific TCA, the paths between the HCA and any LUN or volume exposed by the TCA are grouped into a set. Occurrence of failures on specific paths of specific sets on specific channels are determined, for example by registering for callbacks or polling for occurrence of events which adversely affect communication between endpoints. Also, I/O operations executed by processor nodes are tracked and failures thereof are detected. When the occurrence of a failure on a specific path of a set is determined, all I/O operations on all paths of the set are proactively rerouted to a separate set on a separate channel that connects the same processor node and storage device.

20 Claims, 4 Drawing Sheets

US 9,172,600 B1

EFFICIENT I/O ERROR ANALYSIS AND PROACTIVE I/O FAILOVER TO ALTERNATE PATHS FOR INFINIBAND CHANNEL

TECHNICAL FIELD

This disclosure pertains generally to computer storage and network technology, and more specifically to efficient I/O error analysis and proactive I/O failover to alternate paths in an InfiniBand channel context.

BACKGROUND

Storage management products provide useful features for managing computer storage, such as logical volume management, journaling file systems, multi-path input/output (I/O) functionality, data volume replication, etc. The storage is typically implemented with multiple underlying physical storage devices, which are managed by the storage system so as to appear as a single storage device to accessing nodes. The multiple physical storage media can be grouped into a single logical unit which is referred to as a LUN (for "logical unit number"), and appears as a single storage device to an accessing node.

The management of underlying physical storage devices can also involve software level logical volume management, in which multiple physical storage devices are made to appear as a single logical volume to accessing nodes. A logical volume can be constructed from multiple physical storage devices directly, or on top of a LUN, which is in turn logically constructed from multiple physical storage devices. A volume manager can concatenate, stripe together or otherwise combine underlying physical partitions into larger, virtual ones.

Storage management is often combined with clustering systems. Clusters are groups of computers that use groups of redundant computing resources in order to provide continued service when individual system components fail. More specifically, clusters eliminate single points of failure by providing multiple servers, multiple network connections, redundant data storage, etc.

Where a cluster is implemented in conjunction with a storage management environment, the computer systems (nodes) of the cluster can access shared storage, such that the shared storage looks the same to each node. Additionally, a cluster volume manager can extend volume management across the multiple nodes of a cluster, such that each node recognizes the same logical volume layout, and the same state of all volume resources at all nodes.

In a storage management environment (or a combined clustering and storage management system), when an I/O operation targeting a given I/O endpoint fails, the host level multi-path component analyzes the I/O error, and routes the I/O to an alternate path. This mechanism has two potential shortcomings. First of all, in a storage environment with a large number of I/O paths such as a cluster, a single failure of a link, port, switch, peripheral device, etc., anywhere between the source node and the target storage device can cause a large number of I/O errors, each of which has to be detected and rerouted. Secondly, even as failed I/Os are being rerouted on alternate paths, new incoming I/Os may be scheduled on one or more path(s) which will fail, but have not yet returned an I/O error, thus resulting in the need for yet more I/O rerouting. This drains computing resources at the host and causes I/O performance degradation.

It would be desirable to address these issues.

SUMMARY

An InfiniBand managed storage environment is made up of one or more processor nodes and one or more managed storage devices. Processor nodes contain host channel adapters ("HCAs") and managed storage devices contain target channel adapters ("TCAs") exposing a plurality of logical units ("LUNs") and logical volumes. For each InfiniBand channel between a specific HCA and a specific TCA, each one of the multiple I/O paths between the HCA and any LUN or logical volume exposed by the TCA are grouped into a path set. Occurrence of failures on specific paths of specific path sets on specific InfiniBand channels are determined. The determining of such occurrences can take different forms.

In some embodiments, a callback is registered for each of multiple InfiniBand events which adversely affect communication between endpoints in the InfiniBand managed storage environment. Examples of such events are a channel adapter failure, a connection failure, a port failure, a switch failure and a link failure. Callbacks can be registered with hardware and/or software components in different embodiments. Determining the occurrence of a failure on a specific path then takes the form of receiving a callback indicating occurrence of an event. In other embodiments, hardware and/or software components are polled at given intervals to determine occurrence of such events. In addition, I/O operations executed by processor nodes are tracked, and thus failures of operations on specific paths are detected.

When the occurrence of a failure on a specific path of a specific path set is determined, all I/O operations on all paths of the specific path set are proactively rerouted to paths of a separate path set on a separate InfiniBand channel, without waiting for I/O errors to occur on other paths of the specific path set. Both InfiniBand channels connect a specific processor node to a specific managed storage device. For example, at least two separate InfiniBand channels can be maintained between the specific processor node and the specific managed storage device. In this case, I/O operations can be rerouted from a path set on one of the two separate InfiniBand channels to a path set on the other. In some embodiments, correction of a determined failure can subsequently be verified, in which case I/O operations can be rerouted back to their original path set.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
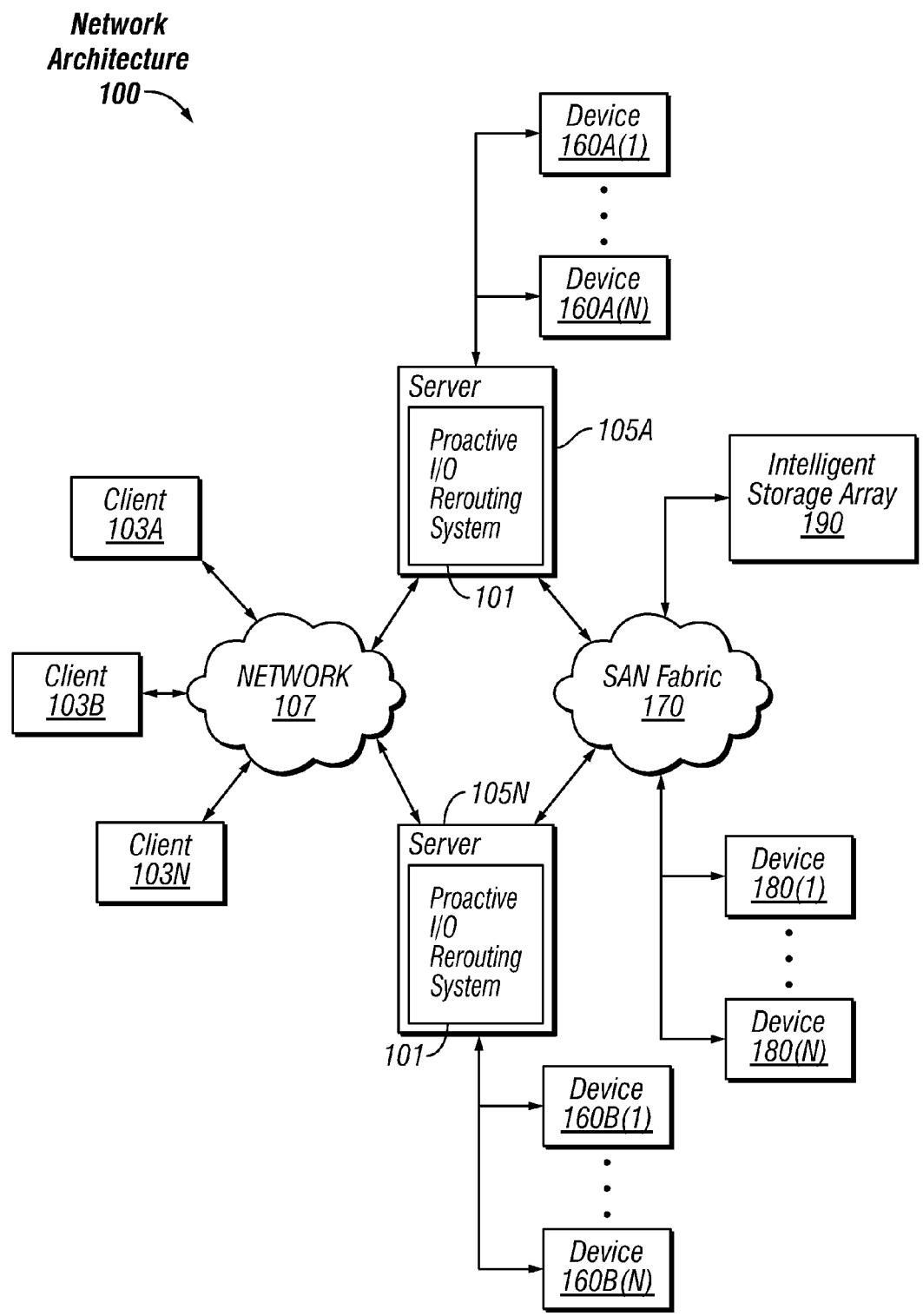
FIG. 1 is a block diagram of an exemplary network architecture in which a proactive I/O rerouting system can be implemented, according to some embodiments.

FIG. 1 is a block diagram illustrating an exemplary network architecture 100 in which a proactive I/O rerouting system 101 can be implemented. In the illustrated network architecture 100, client systems 103A, 103B and 103N, as well as servers 105A and 105N, are communicatively coupled to a network 107. A proactive I/O rerouting system 101 is illustrated as residing on servers 105A and 103N, but in other embodiments the proactive I/O rerouting system 101 can reside on a single computer 210 or be distributed between other multiple computers 210 as desired. In FIG. 1, server 105A is further depicted as having storage devices 160A(1)-(N) directly attached, and server 105N is depicted with storage devices 160B(1)-(N) directly attached. Servers 105A and 105N are also connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. In different embodiments storage can be implemented using various technologies, protocols, topologies, etc., such as FC, InfiniBand, Ethernet, TCP/IP, FCP, iSER, FCoE, iSCSI, etc., instead of or in combination with a SAN fabric 170.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190. Clients 103 can be in the form of, for example, desktop computers, laptop computers, or mobile computing devices, comprising portable computer systems capable of connecting to a network 107 and running applications. Such mobile computing devices are sometimes referred to as smartphones, although some mobile phones not so designated also have these capabilities. Tablet computers are another example of mobile computing devices.

Although FIG. 1 illustrates three clients 103A-N and two servers 105A-N as an example, in practice many more (or fewer) computers can be deployed. In one embodiment, the network 107 is in the form of the internet. Other networks 107 or network-based environments can be used in other embodiments.

Figure 2:
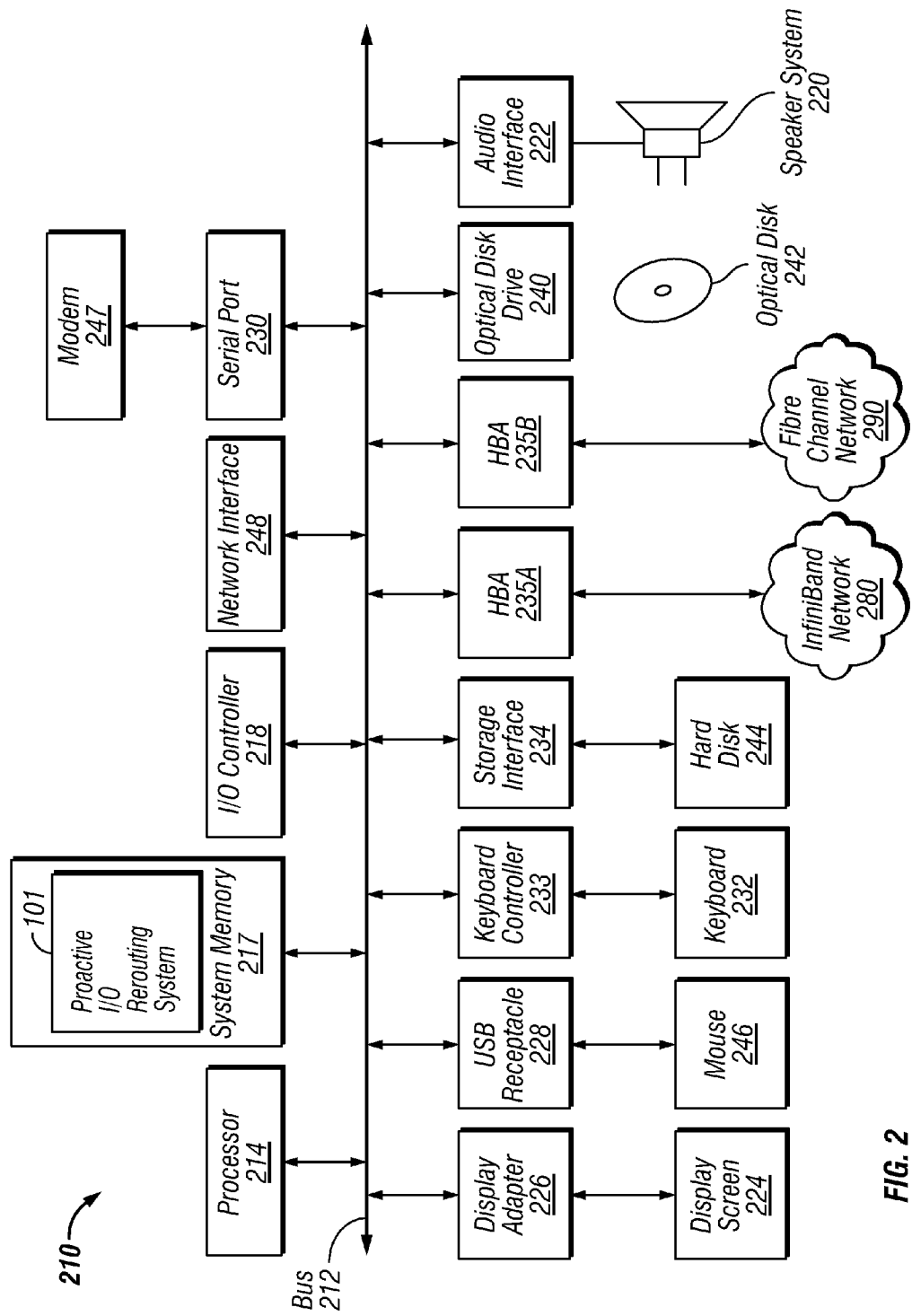
FIG. 2 is a block diagram of a computer system suitable for implementing a proactive I/O rerouting system, according to some embodiments.

FIG. 2 is a block diagram of a computer system 210 suitable for implementing a proactive I/O rerouting system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), an InfiniBand host channel adapter (HCA) 235A configured to connect with an InfiniBand network 280 (which can be in the form of an InfiniBand SAN Fabric $170_{InfiniBand}$) an FC host bus adapter (HBA) 235B configured to connect with a Fibre Channel (FC) network 290 (which can be in the form of an FC SAN Fabric $170_{FC}$), an optical disk drive 240 configured to receive an optical disk 242, a mouse 246 (or other pointing device) coupled to the bus 212, e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the proactive I/O rerouting system 101 is illustrated as residing in system memory 217. The workings of the proactive I/O rerouting system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
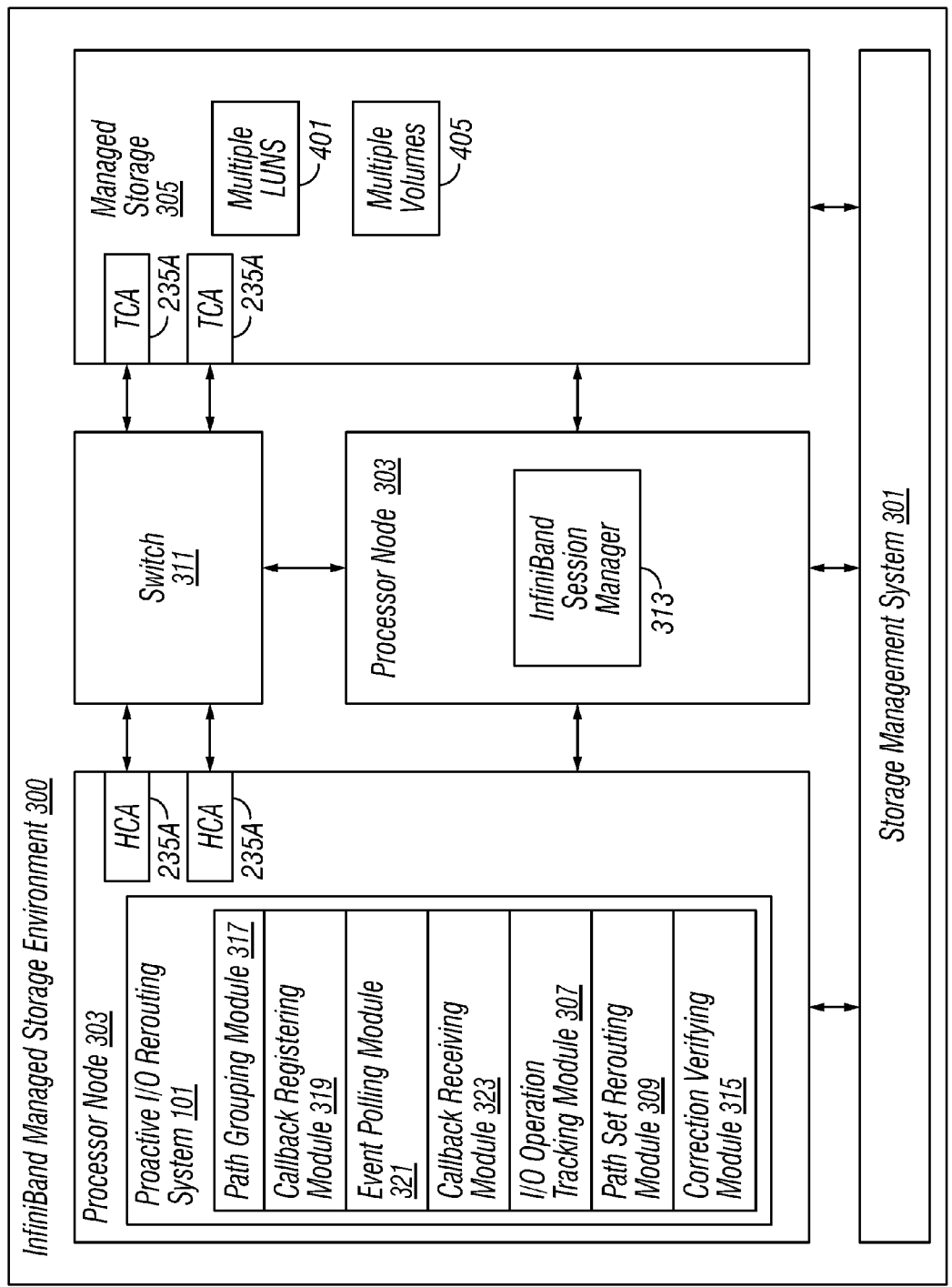
FIG. 3 is a block diagram of the operation of a proactive I/O rerouting system, according to some embodiments.

Turning now to FIG. 3, the operation of a proactive I/O rerouting system 101 is illustrated. The proactive I/O rerouting system 101 utilizes InfiniBand network topology to form sets of I/O paths based on the connection endpoints, as described in detail below. The proactive I/O rerouting system 101 then registers for InfiniBand event callbacks at a hardware or software level. The process of registering for event callbacks in this context is described in greater detail below. When an event occurs indicating a connection failure (or when an I/O error occurs) on any individual path, the proactive I/O rerouting system 101 routes I/O operations for all the paths of the corresponding path set to paths of an alternate set, without waiting for actual I/O errors to occur. In other words, if an event or error occurs indicating a connection failure on any one of the paths, rather than waiting for I/O errors to occur and reactively rerouting failed I/O operations, the proactive I/O rerouting system 101 proactively reroutes I/O operations for all of the paths in the given set.

FIG. 3 illustrates an instance of a proactive I/O rerouting system 101 running on a node 303 in an InfiniBand managed storage environment 300. InfiniBand is a computer network communications link that supports a switched fabric topology. Under an InfiniBand network architecture, processor nodes 303 are connected to peripheral I/O nodes such as high performance managed storage devices 305. All transmissions begin or end at an InfiniBand channel adapter 235A. Each processor node 303 contains a host channel adapter (HCA) 235A$_{HOST}$ and each peripheral node 305 contains a target channel adapter (TCA) 235A$_{TARGET}$. The network communication link between an HCA 235A$_{HOST}$ and a TCA 235A$_{TARGET}$ is referred to as a channel. As with other network interconnects, switches 311 can sit between the end points of a connection, and process, forward and route data. Typically a single InfiniBand session manager 313 performs various software level administration functions, and can execute on any processor node 303.

As described above, the functionalities of the proactive I/O rerouting system 101 can reside on a server 105, a client 103, or be distributed between multiple computer systems 210, including within a fabric/cloud-based computing environment in which the functionality of the proactive I/O rerouting system 101 is provided as a service over a network 107. It is to be understood that although the proactive I/O rerouting system 101 is illustrated in FIG. 3 as a single entity, the illustrated proactive I/O rerouting system 101 represents a collection of functionalities, which can be instantiated as a single or multiple modules as desired (an instantiation of a specific, multiple module proactive I/O rerouting system 101 is illustrated in FIG. 3). It is to be understood that the modules of the proactive I/O rerouting system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the proactive I/O rerouting system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

In FIG. 3, in addition to the node 303 on which the proactive I/O rerouting system 101 resides, an InfiniBand session manager 313 is illustrated as executing on a second node 303. The InfiniBand session manager 313 need not reside on a dedicated node 303, but is illustrated this way for purposes of explanation. Also for efficiency of illustration and explanation, a storage management system 301 is illustrated as a centralized component residing outside of any node 303. It is to be understood that the storage management system 301 represents a collection of functionalities, which in practice are typically instantiated as a plurality of distributed components.

The managed storage 305 is illustrated in FIG. 3 as a single entity. In practice, the managed storage 305 is typically implemented with an underlying intelligent storage array 109 comprising multiple physical storage devices 160, which are managed by the storage management system 301 so as to appear as multiple logical units (LUNs) 401, each with multiple volumes 405, to computer systems 210 accessing the managed storage 305. Thus, multiple LUNs 401 each having multiple logical volumes 405 can be built on top of individual or grouped physical storage devices 160. An example of the architecture of one such scenario according to one embodiment is illustrated in FIG. 4, which is discussed in more detail below.

For efficiency of illustration and explanation, FIG. 3 illustrates an InfiniBand managed storage environment 300 with only two nodes 303, one switch 311 and one managed storage device 305. It is to be understood that an InfiniBand managed storage environment 300 can be implemented on a much larger scale and can include many more endpoints and networking components, for example within the context of a cluster implemented in conjunction with a clustering and storage management system. Each processor node 303 can be instantiated as a physical/virtual host computer 210, for example of the type illustrated in FIG. 2.

Figure 4:
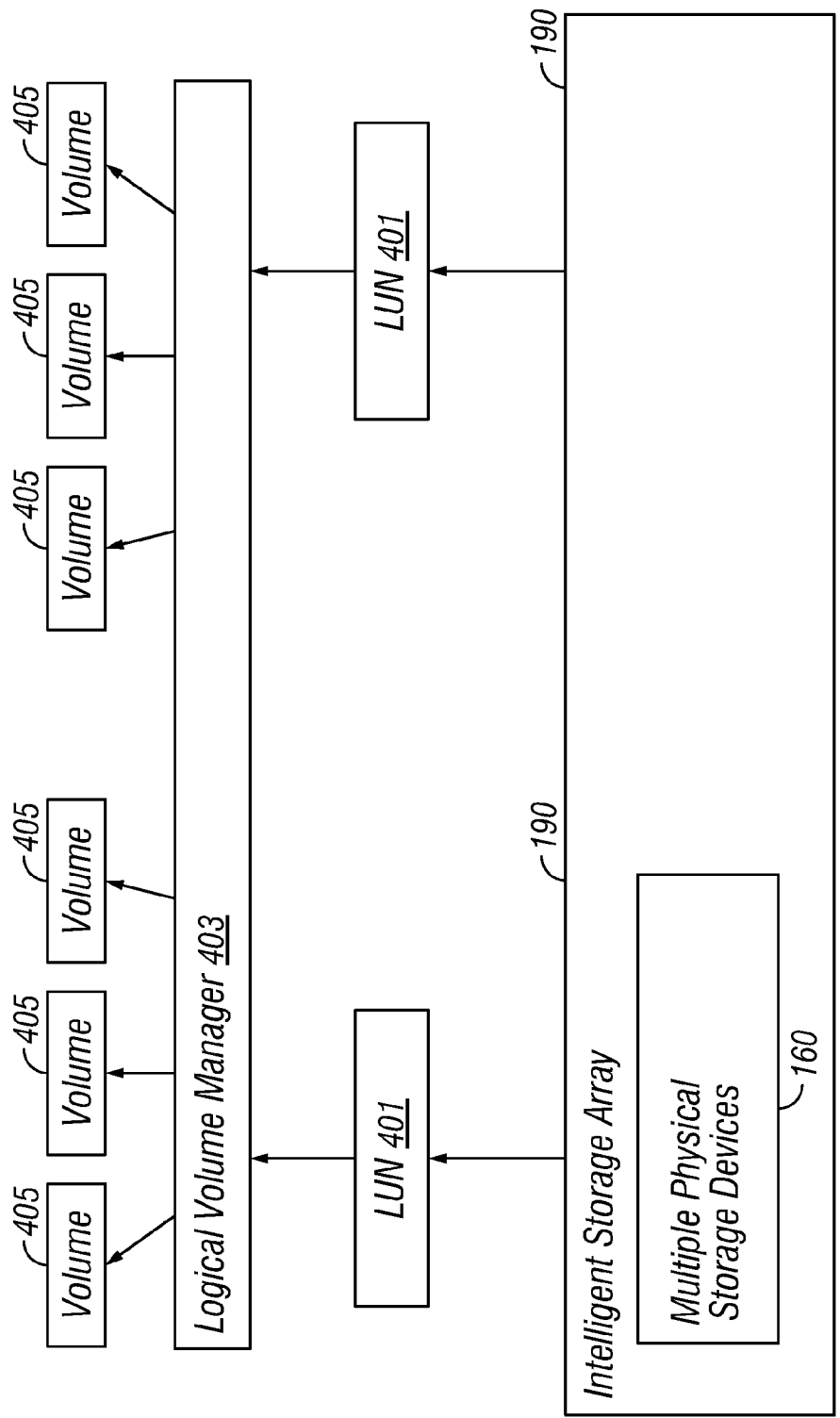
FIG. 4 is a block diagram of a managed storage architecture utilized by a proactive I/O rerouting system, according to some embodiments.

Turning briefly to FIG. 4, a managed storage 305 architecture is illustrated, according to some embodiments. Intelligent storage arrays 190 group multiple physical storage devices 160 into single logical units (LUNs) 401. Each LUN 401 appears as a single storage device 160 to an accessing node 303. The logical volume manager 403 of the storage management system 301 can in turn provide software level logical volume management to create multiple logical volumes 405 on top of each LUN 401. Although FIG. 4 illustrates two LUNs 401 each of which is logically treated as three volumes 405, it is to be understood that InfiniBand managed storage environments 300 can contain more or fewer LUNs 401, and that more or fewer logical volumes 405 can be built on top of a given LUN 401. It is also possible to create a single logical volume 405 from multiple LUNs 401 (not illustrated).

Returning to FIG. 3, a path grouping module 317 of the proactive I/O rerouting system 101 groups all of the paths on a given InfiniBand channel between a source HCA 235A$_{HOST}$ and a target TCA 235A$_{TARGET}$ into a set. It is to be understood that in InfiniBand managed storage environment 300, multiple I/O paths exist between the same connection endpoints, because of the nature of the managed storage 305. More specifically, as explained above multiple LUNs 401 can be built on top of single physical storage devices 160, and multiple logical volumes 405 can be built on top of a given LUN 401 (or physical storage device 160). Suppose a single physical storage device 160 exposes (for example) ten LUNs 401, which in turn each expose (for example) three logical volumes 405. The single physical storage device 160 thus exposes thirty logical I/O targets. The storage management system 301 manages the underlying physical storage 160 so that it appears to the nodes 303 as the above-described multiple volumes 405 of the multiple LUNs 401, and the nodes 303 target their I/O operations accordingly (i.e., to specific ones of the multiple logical targets). However, all of the paths between a given HCA 235A$_{HOST}$ on a processor node 303 and the multiple volumes 405 and LUNs 401 exposed by the given underlying storage device 160 are actually on the single channel between the HCA 235A$_{HOST}$ on the processor node 303 and the TCA 235A$_{TARGET}$ on the underlying physical storage device 160. If there is a failure anywhere on this channel (e.g., a channel adapter failure, a port failure on a switch 311, a link failure, etc.), I/O operations on all of these paths are subject to failure. The path grouping module 317 thus groups all of these paths into a single set, which is used for proactive rerouting as described below. It is to be understood that although FIG. 3 illustrates a single plurality of paths between a single node 303 and storage device 305 going through a single switch 311 for efficiency of illustration and explanation (as well as an alternate channel between the same two endpoints), in practice an InfiniBand managed storage environment 300 would typically contain many channels between many different processor nodes 303 and storage destinations being routed through many switches 311 and other network infrastructure. For each channel, the path grouping module 317 groups all of the paths on the channel into a set. The path grouping module 317 can be thought of as using the InfiniBand topology to form sets of I/O paths based on the connection endpoints.

A callback registering module 319 of the proactive I/O rerouting system 101 registers callbacks for InfiniBand events that adversely affect communication between endpoints, such as channel adapter failure, connection failure, port failure, switch failure, link failure, etc. The callback registering module 319 can register for callbacks with Infini-Band Channel Adapters 235A and other hardware components (e.g., switches 311) for every channel between endpoints of the InfiniBand managed storage environment 300. Thus, when such an event occurs, the proactive I/O rerouting system 101 receives a callback and can proactively reroute affected paths as described below.

In other embodiments, instead of (or in addition to) registering for callbacks with the relevant InfiniBand hardware components, the callback registering module 319 registers for callbacks with the InfiniBand session manager 313. As described above, an InfiniBand session manager 313 acts in an administrative capacity for the InfiniBand network installation at a software level. As such, the InfiniBand session manager 313 tracks events of the type described above. Thus, registering for callbacks with the session manager 313 is another method for the proactive I/O rerouting system 101 to be made aware of such events as they occur. It is to be understood that the exact events that adversely affect communication between endpoints for which to register, as well as the specific InfiniBand hardware and/or software components with which to register, can vary between embodiments.

In other embodiments, rather than (or in addition to) registering for callbacks, an event polling module 321 of the proactive I/O rerouting system 101 polls InfiniBand hardware components such as channel adapters 235 and switches, and/or polls the InfiniBand session manager 313, to determine whether InfiniBand events of interest have occurred. The specific intervals at which to poll which specific InfiniBand hardware and/or software components for which specific events are variable design parameters.

In callback registration based embodiments, when an InfiniBand event occurs for which a callback has been registered, a callback receiving module 323 of the proactive I/O rerouting system 101 receives the corresponding callback. In polling based embodiments, the proactive I/O rerouting system 101 learns of the occurrence of such events through the above-described polling process. Furthermore, in either case, an I/O operation tracking module 307 of the proactive I/O rerouting system 101 tracks I/O operations (e.g., reads and writes targeting managed storage 305) executed by processor nodes 303, and thus detects any failure of an I/O operation between endpoints of the InfiniBand managed storage environment 300.

When the proactive I/O rerouting system 101 learns of an event that indicates a connection failure on any path of a given path set, a path set rerouting module 309 proactively routes I/O operations on every path of the set to a different path set, without waiting for actual I/O errors to occur on these paths. Because each path of the set is actually on a single underlying InfiniBand channel, a failure anywhere on a single one of these paths is likely to result in I/O errors on all of the paths of the set. By rerouting the I/Os of the entire path set to a separate path set, which is on a separate underlying InfiniBand channel, failed I/O operations on the paths of the set are avoided before they occur, resulting in improved I/O performance.

For example, FIG. 3 illustrates two separate InfiniBand channels between processor node 303 and managed storage device 305. The first channel runs between First HCA $235A_{HOST}$ and First TCA $235A_{TARGET}$, whereas the second channel runs between Second HCA $235A_{HOST}$ and Second TCA $235A_{TARGET}$. The path grouping module 317 groups the multiple paths between First HCA $235A_{HOST}$ on processor node 303 and the various volumes 405 and LUNS 401 exposed by First TCA $235A_{TARGET}$ on managed storage device 305 into a first set, and the multiple paths between Second HCA $235A_{HOST}$ on processor node 303 and the various volumes 405 and LUNS 401 exposed by Second TCA $235A_{TARGET}$ on managed storage device 305 into a second set. When an event occurs indicating a failure on any path of the first set, the I/Os on all the paths of the first set are rerouted to the second set, which is backed by the second channel. Likewise, when an event occurs indicating a failure on any path of the second set, the I/Os on all the paths of the second set are rerouted to the first set, which is backed by the first channel. It is to be understood that whereas FIG. 3 illustrates only two separate path sets each backed by a separate channel, in practice an InfiniBand managed storage environment 300 would typically contain many more path sets each backed by a separate InfiniBand channel and encompassing multiple paths between various endpoints.

In addition to proactive rerouting when an InfiniBand event occurs, when an I/O error is detected on any path of a given set, in a like manner the path set rerouting module 309 proactively routes I/O operations on every path of the set to a different path set, without waiting for actual I/O errors to occur on the other paths. As with the occurrence of an event indicative of a connection failure on a single path, an I/O error on any path of the set is indicative that I/O errors will occur on all of the paths of the set. Thus, the I/O operations of the entire path set are rerouted to a separate path set, as described above, thereby proactively preventing failed I/O operations on the other paths before they occur.

In some embodiments, a failure correction verifying module 315 of the proactive I/O rerouting system 101 verifies when a given connection failure or the like that resulted in the proactive rerouting of I/O operations between path sets has been corrected. In this case, I/O operations can be rerouted back to their original path set once such a correction has been verified.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for proactively rerouting input/output ("I/O") operations in an InfiniBand managed storage environment comprising at least one processor node containing a host channel adapter ("HCA") and at least one managed storage device containing at least one target channel adapter ("TCA") exposing a plurality of logical units ("LUNs") and logical volumes, the method comprising the steps of:
   for each InfiniBand channel between a specific HCA and a specific TCA in the InfiniBand managed storage environment, grouping, by a computer, each one of a plurality of I/O paths between the HCA and any LUN or logical volume exposed by the TCA into a path set;
   determining, by the computer, an occurrence of a failure on a specific path of a specific path set on a specific InfiniBand channel; and
   proactively rerouting all I/O operations on all paths of the specific path set to paths of a separate path set on a separate InfiniBand channel, without waiting for I/O errors to occur on other paths of the specific path set, wherein the specific InfiniBand channel and the separate InfiniBand channel both connect a specific processor node to a specific managed storage device.

2. The method of claim 1 further comprising:
   registering a callback for each of a plurality of InfiniBand events which adversely affect communication between endpoints in the InfiniBand managed storage environment; and
   wherein determining an occurrence of a failure on a specific path of a specific path set on a specific InfiniBand channel further comprises receiving a callback indicating occurrence of an event for which a callback was registered, wherein the occurrence of the event is on the specific path of the specific path set.

3. The method of claim 2 wherein registering a callback for an InfiniBand event further comprises:
   registering a callback for an InfiniBand event with an InfiniBand hardware component.

4. The method of claim 2 wherein registering a callback for an InfiniBand event further comprises:
   registering a callback for an InfiniBand event with an InfiniBand software component.

5. The method of claim 2 wherein registering a callback for an InfiniBand event further comprises:
   registering a callback for at least one event from a group of events consisting of: a channel adapter failure, a connection failure, a port failure, a switch failure and a link failure.

6. The method of claim 1 further comprising:
   polling at given intervals to determine occurrence of each of a plurality of InfiniBand events which adversely affect communication between endpoints in the InfiniBand managed storage environment; and
   wherein determining an occurrence of a failure on a specific path of a specific path set on a specific InfiniBand channel further comprises learning of an occurrence of an event on the specific path of the specific path set, as a result of polling to determine occurrence of the event.

7. The method of claim 6 wherein polling to determine occurrence of an InfiniBand event further comprises:
   polling an InfiniBand hardware component to determine occurrence of an InfiniBand event.

8. The method of claim 6 wherein polling to determine occurrence of an InfiniBand event further comprises:
   polling an InfiniBand software component to determine occurrence of an InfiniBand event.

9. The method of claim 6 wherein polling to determine occurrence of an InfiniBand event further comprises:
   polling to determine occurrence of at least one event from a group of events consisting of: a channel adapter failure, a connection failure, a port failure, a switch failure and a link failure.

10. The method of claim 1 further comprising:
    tracking I/O operations executed by processor nodes of the InfiniBand managed storage environment; and
    wherein determining an occurrence of a failure on a specific path of a specific path set on a specific InfiniBand channel further comprises detecting failure of a specific I/O operation on the specific path of the specific path set.

11. The method of claim 1 further comprising:
    maintaining at least two separate InfiniBand channels between at least one specific processor node and at least one specific managed storage device; and
    wherein proactively rerouting all I/O operations on all paths of the specific path set to paths of the separate path set further comprises rerouting the I/O operations from a path set on a first one of the at least two separate InfiniBand channels between the specific processor node and the specific managed storage device to a path set on a second one of the at least two separate InfiniBand channels between the specific processor node and the specific managed storage device.

12. The method of claim 1 further comprising:
    subsequently to rerouting all I/O operations on all paths of the specific path set to paths of the separate path set, verifying correction of the determined failure; and
    rerouting I/O operations on the separate path set back to their original path set.

13. At least one non-transitory computer readable-storage medium for proactively rerouting input/output ("I/O") operations in an InfiniBand managed storage environment comprising at least one processor node containing a host channel adapter ("HCA") and at least one managed storage device containing at least one target channel adapter ("TCA") exposing a plurality of logical units ("LUNs") and logical volumes, the at least one non-transitory computer readable-storage medium storing computer executable instructions that, when loaded into computer memory and executed by at least one processor of a computing device, cause the computing device to perform the following steps:
    for each InfiniBand channel between a specific HCA and a specific TCA in the InfiniBand managed storage environment, grouping each one of a plurality of I/O paths between the HCA and any LUN or logical volume exposed by the TCA into a path set;
    determining an occurrence of a failure on a specific path of a specific path set on a specific InfiniBand channel; and
    proactively rerouting all I/O operations on all paths of the specific path set to paths of a separate path set on a separate InfiniBand channel, without waiting for I/O errors to occur on other paths of the specific path set, wherein the specific InfiniBand channel and the separate InfiniBand channel both connect a specific processor node to a specific managed storage device.

14. The at least one non-transitory computer readable-storage medium of claim 13 further storing computer executable instructions that, when loaded into computer memory and executed by at least one processor of a computing device, cause the computing device to perform the following step:
  registering a callback for each of a plurality of InfiniBand events which adversely affect communication between endpoints in the InfiniBand managed storage environment; and
  wherein determining an occurrence of a failure on a specific path of a specific path set on a specific InfiniBand channel further comprises receiving a callback indicating occurrence of an event for which a callback was registered, wherein the occurrence of the event is on the specific path of the specific path set.

15. The at least one non-transitory computer readable-storage medium of claim 14 wherein registering a callback for an InfiniBand event further comprises:
  registering a callback for an InfiniBand event with an InfiniBand hardware component.

16. The at least one non-transitory computer readable-storage medium of claim 14 wherein registering a callback for an InfiniBand event further comprises:
  registering a callback for an InfiniBand event with an InfiniBand software component.

17. The at least one non-transitory computer readable-storage medium of claim 13 further storing computer executable instructions that, when loaded into computer memory and executed by at least one processor of a computing device, cause the computing device to perform the following step:
  polling at given intervals to determine occurrence of each of a plurality of InfiniBand events which adversely affect communication between endpoints in the InfiniBand managed storage environment; and
  wherein determining an occurrence of a failure on a specific path of a specific path set on a specific InfiniBand channel further comprises learning of an occurrence of an event on the specific path of the specific path set, as a result of polling to determine occurrence of the event.

18. The at least one non-transitory computer readable-storage medium of claim 13 further storing computer executable instructions that, when loaded into computer memory and executed by at least one processor of a computing device, cause the computing device to perform the following step:
  tracking I/O operations executed by processor nodes of the InfiniBand managed storage environment; and
  wherein determining an occurrence of a failure on a specific path of a specific path set on a specific InfiniBand channel further comprises detecting failure of a specific I/O operation on the specific path of the specific path set.

19. The at least one non-transitory computer readable-storage medium of claim 13 further storing computer executable instructions that, when loaded into computer memory and executed by at least one processor of a computing device, cause the computing device to perform the following step:
  maintaining at least two separate InfiniBand channels between at least one specific processor node and at least one specific managed storage device; and
  wherein proactively rerouting all I/O operations on all paths of the specific path set to paths of the separate path set further comprises rerouting the I/O operations from a path set on a first one of the at least two separate InfiniBand channels between the specific processor node and the specific managed storage device to a path set on a second one of the at least two separate InfiniBand channels between the specific processor node and the specific managed storage device.

20. A computer system for proactively rerouting input/output ("I/O") operations in an InfiniBand managed storage environment comprising at least one processor node containing a host channel adapter ("HCA") and at least one managed storage device containing at least one target channel adapter ("TCA") exposing a plurality of logical units ("LUNs") and logical volumes, the computer system comprising:
  at least one processor;
  system memory;
  a path grouping module residing in the system memory, the path grouping module being programmed to group, for each InfiniBand channel between a specific HCA and a specific TCA in the InfiniBand managed storage environment, each one of a plurality of I/O paths between the HCA and any LUN or logical volume exposed by the TCA into a path set;
  a callback registering module residing in the system memory, the callback registering module being programmed to register a callback for each of a plurality of InfiniBand events which adversely affect communication between endpoints in the InfiniBand managed storage environment;
  an event polling module residing in the system memory, the event polling module being programmed to poll at given intervals to determine occurrence of each of a plurality of InfiniBand events which adversely affect communication between endpoints in the InfiniBand managed storage environment;
  an I/O operation tracking module residing in the system memory, the I/O operation tracking module being programmed to track I/O operations executed by processor nodes of the InfiniBand managed storage environment; and
  a path set rerouting module residing in the system memory, the path set rerouting module being programmed to reroute all I/O operations on all paths of the specific path set to paths of a separate path set on a separate InfiniBand channel proactively, without waiting for I/O errors to occur on other paths of the specific path set, wherein the specific InfiniBand channel and the separate InfiniBand channel both connect a specific processor node to a specific managed storage device.

* * * * *